Sept. 13, 1927.                R. LIEBERT ET AL                1,642,036
                          POWER PLANT FOR AIRSHIPS
                          Filed Oct. 19, 1925        2 Sheets-Sheet 1
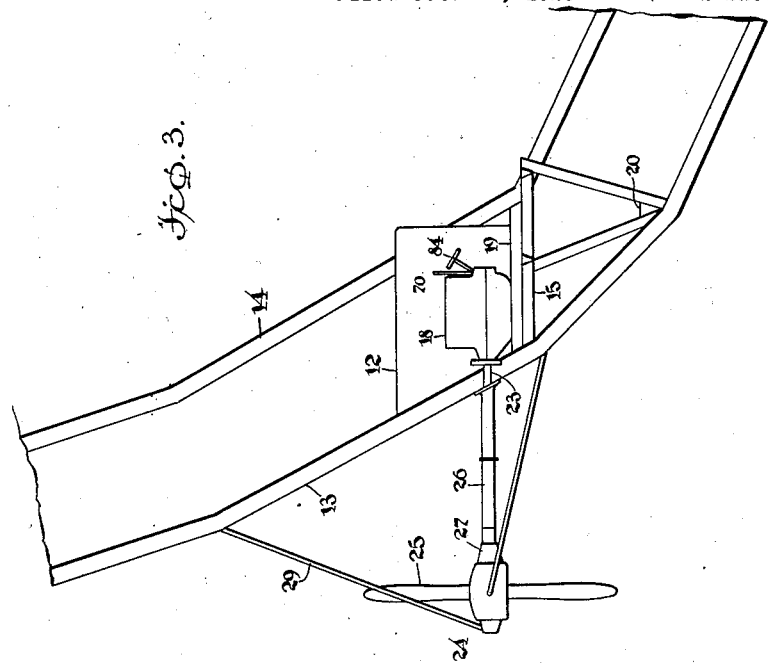
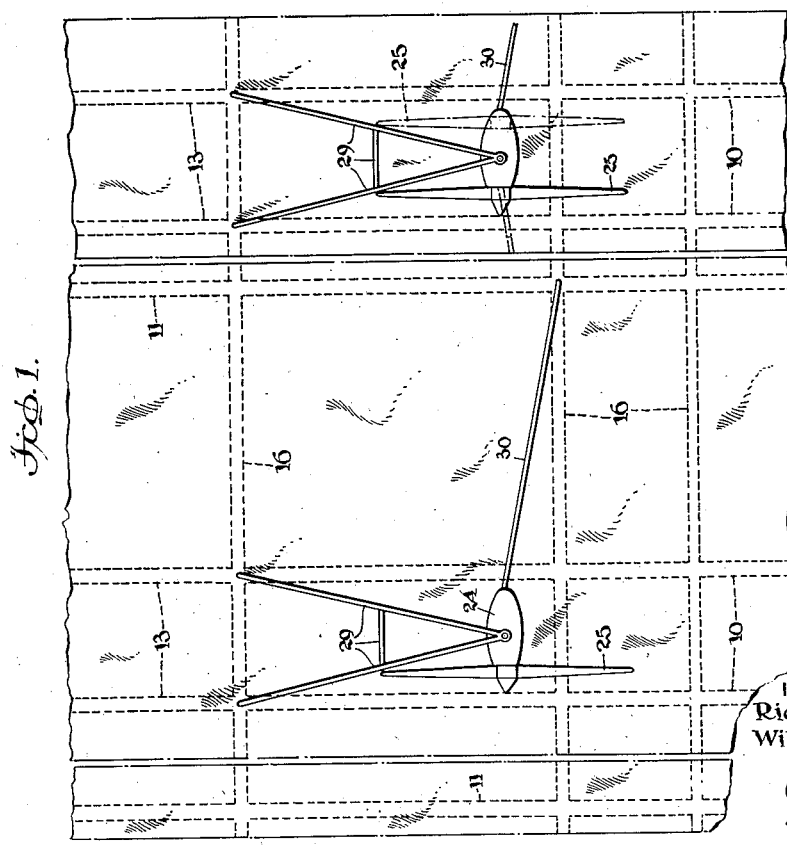
INVENTORS
Richard Liebert,
Wilhelm Fischer,
ATTORNEY

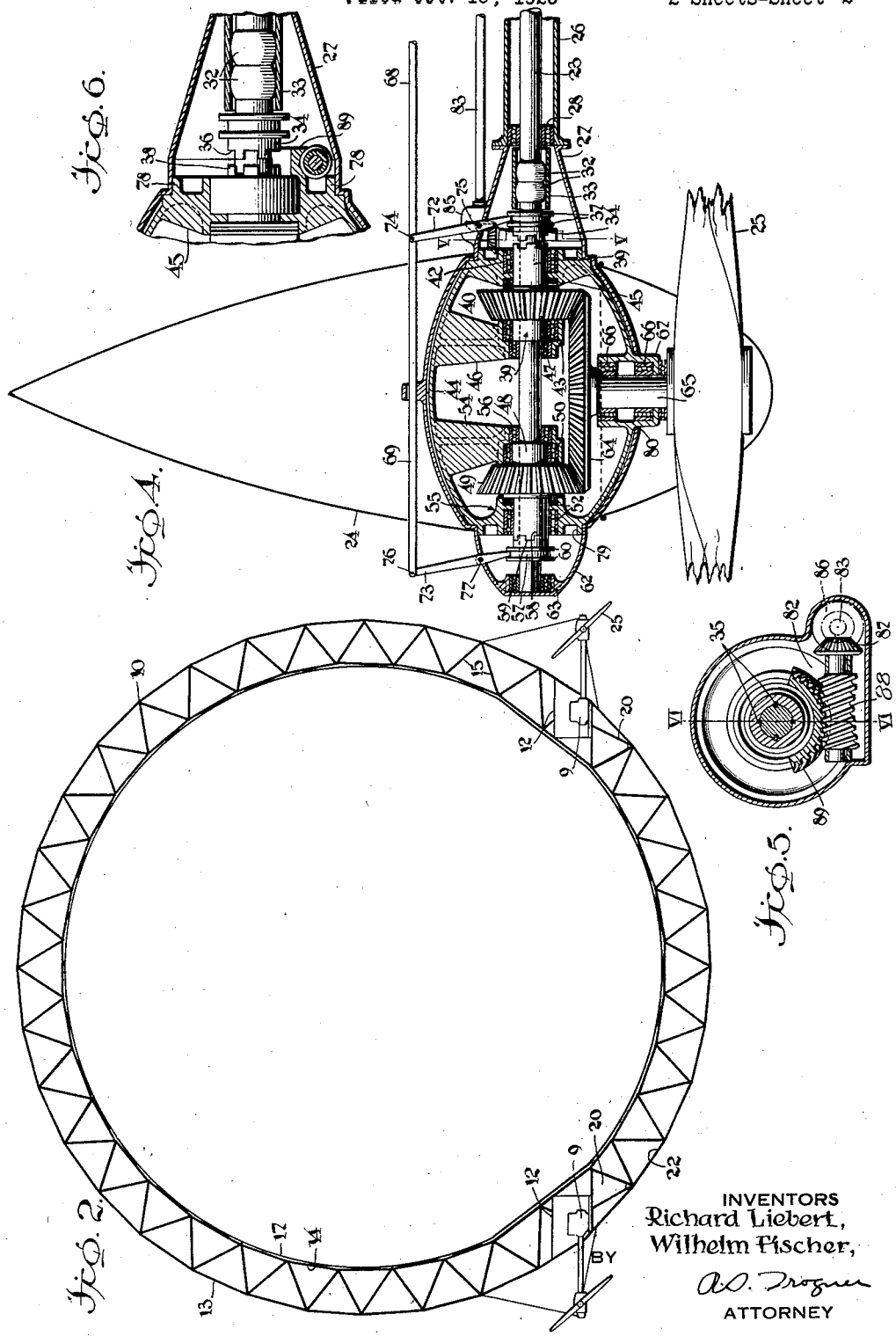

Patented Sept. 13, 1927.

1,642,036

UNITED STATES PATENT OFFICE.

RICHARD LIEBERT AND WILHELM FISCHER, OF AKRON, OHIO, ASSIGNORS TO GOODYEAR-ZEPPELIN CORPORATION, OF AKRON, OHIO, A CORPORATION OF DELAWARE.

POWER PLANT FOR AIRSHIPS.

Application filed October 19, 1925. Serial No. 63,379.

Our invention relates to airships and it has particular relation to a novel type of power plant installation which is adapted to be employed in rigid airships.

One object of our invention is to provide a power plant installation in which the prime mover is disposed within the circumferential boundaries of an airship, thereby permitting a relative reduction of wind resistance incident to the navigation of the airship without decreasing the amount of available gas space.

Another object of our invention is to provide an airship power plant which is provided with a propeller whose position may be varied and which is so geared and installed that it will swing not more than 90 degrees about the axis of its transmission shaft and at the same time will permit the propellers to be adjusted to exert forces upon the airship to control all movements thereof, whether upward or downward, forward or rearward.

Another object of our invention is to so construct and arrange power units in an airship that they are in direct communication with each other by means of suitable rigid supporting structures, and they are provided with sufficient engine space to facilitate repair work, at the same time reducing the wind resistance to a minimum without sacrificing the gas volume.

Rigid airships have heretofore been provided with special power cars disposed outside the hull or envelope. These power cars had great weight and were suspended by means of long cables and struts, the points of suspension being distributed over several structural rings or cross frames. Consequently the air resistance caused by the power cars and their suspension elements was quite considerable. Owing to the fact that the cross frame structures were relatively frail it was impossible, from a practical standpoint, to build the power units inside the airship hull.

By our invention we provide power units which are disposed within the circumferential boundaries of an airship and the necessity of building heavy enclosing outside cars for each power unit is obviated. The main rings or cross frames are sufficiently large in cross section to provide adequate space for the power units, and sufficient space for mechanics to operate or repair them. All power units are conveniently accessible by longitudinal corridors or gangways which intersect and connect the main cross frames adjacent the location of the power units and aid in stiffening the main rings or cross frames against vibration at the intersecting points. The main cross frames or rings also are provided with gangways along their lower portions to facilitate communication between the power units. In order to reduce wind resistance to a minimum the only parts of the power plant mechanism disposed at the outside of the hull are the propellers and their bracing supports. One strut of the support for each power plant also functions as a streamline housing having bearings therein for receiving the transmission shaft and to prevent vibration of the latter.

Our invention also provides means for varying the position of the propellers to change the direction of the forces exerted thereby, without interfering with the operation of the propellers or with the operation of the motors.

For a better understanding of our invention reference may now be had to the accompanying drawings forming a part of this specification, of which:

Fig. 1 is a fragmentary elevational view of an airship illustrating propeller installation for power units constructed according to our invention;

Fig. 2 is a cross-sectional view of an airship illustrating a main ring and power units incorporated therein according to our invention;

Fig. 3 is a fragmentary elevational view illustrating one of the power units installed in a main ring of an airship according to our invention;

Fig. 4 is a fragmentary cross-sectional view, on an enlarged scale, showing in detail the propeller operating mechanism;

Fig. 5 is a cross-sectional view, on an enlarged scale, showing details of construction of an adjusting mechanism for the propeller operating mechanism, the view being taken substantially along the line V—V of Fig. 4; and, Fig. 6 is a fragmentary cross-sectional view, on an enlarged scale, of a reversing gear, parts thereof being broken away for the sake of clearness, the view being taken substantially along the line VI—VI of Fig. 5.

In practicing our invention we provide a plurality of power units 9, each mounted in a main ring or cross frame member 10, which is spaced from auxiliary rings 11, forming a part of the fabricated hull structure of a rigid airship. A chamber 12 having walls of suitable thin material, such as fabric or metal, encloses the individual power units 9. The main ring 10 consists of outer circumferentially arranged structural girders 13 and an inner circumferentially disposed structural girder 14, which girders are secured together by means of transversely disposed cross members 15. Longitudinally disposed girders 16 are secured to the main rings and to the auxiliary rings 11 in the usual manner well known in the art of constructing rigid airships. The main and auxiliary rings and the longitudinal girders constitute a fabricated hull within which a suitable gas bag 17 is disposed.

Each power unit 9 includes a motor 18, mounted upon a normally horizontal platform 19 carried by the cross members 15 of the main ring 10. Adjacent the platform 19 longitudinal gangways or corridors 20 are provided which extend the entire length of the airship. The two gangways or corridors 20 intersect the main rings 9 and they are disposed at opposite sides of the airship and are disposed below the horizontal diameter thereof. As the intersection of the main rings 9 and the corridors 20 provide a firm structural reinforcement, the advantage of installing the motors at this point is obvious.

The corridors 20 also intersect a gangway 22 extending along the lower portion of the main ring 10 circumferentially thereof, the gangway affording direct communication between the motor supporting platforms 19 on opposite sides of the airship. From this description it will be apparent that the several main power units located in the several main rings, as above described, are so positioned with respect to the corridors and gangways that members of the airship crew will experience no difficulty or inconvenience in walking from one power unit to another.

It will be observed that each motor 18 is so mounted that its axis is disposed in a plane approximately at right-angles to the longitudinal axis of the airship and a transmission shaft 23 projects in alinement with the motor axis through the side of the airship. Its outer end is supported in a stream line gearing housing 24, which supports a propeller 25. As indicated in dot-and-dash lines of Fig. 1, one or more of the propellers 25 on each side of the airship may be employed as pusher propellers, while those indicated in full lines are tractor propellers. These propellers are adapted to be moved angularly to effect any desired relationship in navigating the airship. An elongated stabilizing housing 26, provided with a flared end portion 27, and having a plurality of roller bearing elements 28 therein, surrounds the transmission shaft 23 and is connected at its outer end to the gearing housing 24. The other end of the elongate housing is secured to the main ring 10.

In order to maintain the gearing housing 24 rigid with respect to the motor and airship hull, a plurality of bracing struts 29 are secured thereto and to the girders 13 of the main ring 10. An additional bracing member 30 is secured to the gearing housing 24 and to an adjacent auxiliary ring 11. The housing 26 also serves as a bracing support cooperating with the struts 29 to provide a rigid mounting for the gearing housing 24.

As best shown in Fig. 4, the transmission shaft 23 is provided with a conventional universal coupling 32 which will prevent injury to the shaft in the event that any of the propeller operating elements become angularly displaced and thereby tend to throw the shaft out of alinement. A suitable protective covering or housing 33 is disposed about the universal coupling.

Adjacent the universal coupling 32 we provide a slidable sleeve clutch 34, which is splined to the transmission shaft 23, as indicated at 35 and it is provided with clutch jaws 36. At the outer portion of the sleeve 34, two flanges 37 are formed which define a circumferential channel, the purpose of which will be explained later.

The jaws 36 of the clutch 34 are adapted to engage co-operating jaws 38 of a sleeve member 39, rotatably mounted upon the transmission shaft 23. A beveled gear 40 is rigidly secured to the sleeve member 39 centrally thereof. Adjacent each end of the sleeve member roller bearings 42 and 43 are provided which are disposed within an inner housing 44, formed with bearing supports 45 and 46. Adjacent the inner end of the sleeve 39 additional bearings 47 are provided for the purpose of stabilizing the transmission shaft 23.

A second sleeve 48 rotatably mounted on the shaft 23 is spaced from the sleeve 39 and it is provided with a beveled gear 49, corresponding to the beveled gear 40. Bearings 50 and 52 mounted between the sleeve member 48 and bearing supporting members 54 and 55 respectively are arranged similarly to the bearings 45 and 46 described with reference to the sleeve member 39. Likewise the bearing support 54 is provided with roller bearings 56 engaging the transmission shaft 23. It will be observed that each of the beveled gearings 40 and 49 is confined against longitudinal movement with respect to the transmission shaft because of its position between the bearings 42—43 and 50–52 respectively. A sleeve clutch 57 is splined upon the shaft 23 in the same manner as the clutch 34 above described. This member is likewise provided with jaws 58 which engage cooperating jaws 59 of the beveled gear sleeve 48. The sleeve clutch 57 is provided with flanges 60 which define a circumferential channel whose function will be described later.

Adjacent the outer end of the transmission shaft 23 a cap member 62 is provided integral with or rigidly secured to the gearing housing 24. Bearings 63 are disposed within the cap member 62 and serve as a support for the outer end of the shaft 23.

A beveled gear 64 which is adapted to engage both of the gears 40 and 49, is rigidly secured to one end of a propeller stub shaft 65 which extends through the inner housing 44. Suitable roller bearings 66 surround the stub shaft and are disposed within a flanged bearing support 67. At the outer end of the stub shaft 65 the propeller 25 is rigidly mounted.

In order to control the direction of rotation of the propeller 25, we provide a lever mechanism 68, which consists of a bar 69 adapted to be operated by a handle 70, and two levers 72 and 73. One end of the lever 72 is pivoted at 74 to the bar and an intermediate portion thereof is pivoted at 75 to the gearing housing 24. The other end of the lever extends into the housing and is disposed between the flanges 37 within the circumferential groove or channel formed thereby. One end of the other lever 73 is pivoted at 76 to the bar 69, the other end thereof being disposed between the flanges 60 of the clutch member 57. The intermediate portion of the lever 73 is pivoted at 77 upon the cap member 62. It will be apparent from this construction that the bar 69, when moved in one direction causes the lever 72 and the clutch member 34 to engage the jaws 38 of the sleeve 39, thus providing a positive drive connection to the stub shaft 65 to rotate the propeller 25 in one direction. Likewise, when the bar 69 is moved in the other direction, the unattached end of the lever 73 will move the clutch member 57 into engagement with the jaws 59 of the gear sleeve 48 while the clutch member 34 is disengaged from the sleeve jaws 38. Consequently, the propeller will be rotated in a direction opposite that above designated.

We have illustrated the beveled gear 64 as being considerably larger than the beveled gears 40 and 49. However, it will be apparent that the relative sizes of these gear members may be varied as desired to obtain the proper relative speed of the propeller 25 without materially changing the structure herein described.

It will be observed that both the cap member 62 and the flanged end portion 27 of the elongate shaft housing are rigid with the gearing housing 24. The rigid structure formed by these members is adapted to engage bearing flanges 78 and 79 provided at the opposite ends of the inner housing 44, which is adapted to rotate with respect to the housing 24 on the bearing flanges. Adjacent the stub shaft 65 we provide a slot 80 in the gearing housing 24, which slot describes an arc of 90 degrees. The stud shaft 65, together with the inner housing is adapted to swing about the transmission shaft 23, the stub shaft moving within the slot 80.

As best shown in Figs. 5 and 6 we provide a worm gear mechanism 82 which is adapted to be operated to swing the propeller and stub shaft about an arc of 90 degrees in a plane at right angles to the transmission shaft 23. This mechanism includes a shaft 83 adapted to be rotated by means of a suitable hand wheel 84 positioned adjacent the motor 18. The outer end of the shaft 83 is mounted in a housing 85 secured to the flared housing 27. At the outer end of the shaft 83, a beveled gear 86 is mounted which engages a cooperating beveled gear 87, the latter being mounted in the housing 27 adjacent the motor transmission shaft. The beveled gear 87 is rigid with the end of a worm shaft 88, which is adapted to engage a segmental cooperating worm gear element 89. The latter segmental worm gear is rigidly secured to the end bearing support 45 upon the flange 78 thereof.

By rotating the shaft 83, the inner housing 44 and consequently the propeller stub shaft 65 are swung radially about the transmission shaft 23. From this construction, it will be apparent that the propeller may be employed for exerting lifting force upon the airship or it may be employed for moving the airship downwardly, as well as performing the usual function of driving the ship forwardly. By constructing the propeller adjusting mechanism in such manner that the stub shaft 65 and the propeller may be adjustably swung about the transmission shaft through an arc not exceeding 90 degrees, and at the same time providing a reversing gear for the propeller, the struts 29 may be connected to the outer extremity of the gearing housing 24, thereby assuring a highly efficient bracing effect. If, on the contrary, the propeller were adapted to swing through an arc of 360 degrees, the bracing supports would of necessity be disposed at extremely sharp angles to the transmission shaft or connected at points spaced considerably from the end thereof. The maximum force exerted by the propellers would be applied throughout 360 degrees. Consequently, a relatively inefficient bracing effect would result and undesirable vibrations in the propeller supporting mechanism would be increased.

From the foregoing description, it will be apparent that we have devised an airship which may be operated relatively economically. In airships whose gas bags are inflated with helium, the power plant described is of exceptional advantage, since it is well known that helium does not possess as great a lifting power as hydrogen. By moving the propellers to different positions for lowering or raising the airship, the necessity of valving the comparatively scarce and expensive helium is obviated. As the air ship is so constructed that the contour thereof is comparatively regular, this being accomplished by disposing the power units within the circumferential boundaries of the hull, relatively greater speed may be attained than that attained in airships of the same size and power as heretofore constructed. Furthermore, the enlarged engine space which facilitates repair of the motors permits the airship to be operated by a smaller crew, the proportion being approximately six to four, as compared with crews required for the operation of airships designed prior to my invention.

Although we have illustrated but one form which our invention may assume and have described in detail but a single application thereof, it will be apparent to those skilled in the art that it is not so limited but that various minor modifications and changes may be made therein without departing from the spirit of our invention or from the scope of the appended claims.

What we claim is:

1. A rigid airship comprising an elongate fabricated hull structure including coaxial substantially annular inner and outer structural elements and means for supporting a motor within the boundaries of the fabricated structure between the inner and outer elements.

2. A rigid airship comprising an elongate fabricated hull structure of annular cross-sectional contour having gas bags therein and means for supporting a motor built within the inner and outer circumferential limits of the annular configuration of the hull structure between the gas bags and the exterior surface of the hull structure.

3. A rigid airship comprising an elongate hull having transversely arranged main rings therein, each ring including substantially annular coaxial inner and outer structural elements, and motors disposed within a plurality of the main rings between the inner and outer structural elements of the respective rings.

4. A rigid airship comprising an elongate hull having a transversely arranged main ring therein, two spaced motors positioned within the main ring adjacent the outer periphery thereof and a gangway extending through the main ring between the motors.

5. A rigid airship comprising an elongate hull having transversely arranged main rings therein, gangways extending through the lower portions of the main rings, longitudinal corridors intersecting the main rings adjacent the gangways communicating with the latter and motors in the main rings adjacent the intersection of the gangways and corridors.

6. A rigid airship comprising an elongate hull having a transversely arranged main ring therein, two spaced motors positioned within the main ring adjacent the outer periphery thereof and a curved gangway confined to the contour of the main ring, extending through the main ring between the motors.

7. A rigid airship comprising an elongate hull having a transversely disposed main ring therein, a motor disposed within the main ring adjacent the outer periphery thereof, the axis of the motor being disposed in a plane substantially at right-angles to the longitudinal axis of the air ship and a transmission shaft extending through the side of the airship and alined with the motor axis.

8. A rigid airship comprising a hull having a transversely disposed main ring therein, a motor mounted within the main ring adjacent the outer surface of the airship, a propeller provided with a transmission shaft extending through the side of the hull in alinement with the axis of the motor and means for varying the position of the axis of the propeller in a plane substantially at right-angles to the axis of the motor.

9. A rigid airship comprising a hull having a transversely arranged main ring therein, a motor mounted within the main ring adjacent the outer surface of the airship, a propeller provided with a transmission shaft extending through the side of the hull, coincidently with the axis of the motor, means for varying the position of the axis of the propeller in a plane substantially at right angles with the axis of the motor and means for reversing the direction of rotation of the propeller.

10. A power unit for aircraft comprising a motor having a transmission shaft extending axially therefrom, a propeller mounted upon a stub shaft disposed substantially at right-angles to the axis of the motor, beveled gear mechanism forming a drive between the transmission shaft and propeller shaft said gear mechanism including a housing having a slot therein, and means for varying the position of the stub shaft within the slot radially about the transmission shaft in a plane substantially at right angles to the latter.

11. A power unit for an aircraft comprising a motor having a transmission shaft extending axially therefrom, a propeller having a stub shaft disposed substantially at right-angles to the axis of the motor, beveled gearing mechanism including a housing forming a drive between the transmission shaft and the propeller stub shaft, gearing for varying the position of the stub shaft radially about the transmission shaft in a plane substantially at right-angles to the latter, means for reversing direction of rotation of the propeller and bracing elements secured to the aircraft and to the housing beyond the end of the transmission shaft permitting radial adjustment of the stub shaft through an angle of approximately 90 degrees.

In witness whereof, we have hereunto signed our names.

RICHARD LIEBERT.
WILHELM FISCHER.